United States Patent [19]

Canadas et al.

[11] Patent Number: 4,562,709

[45] Date of Patent: Jan. 7, 1986

[54] CAP FOR A CONTAINER AND IN PARTICULAR FOR A FUEL TANK FOR AN AUTOMOBILE VEHICLE

[75] Inventors: Jean C. Canadas; Michel Steiner, both of Remiremont, France

[73] Assignee: Compagnie Industrielle de Mecanismes en abrege C.I.M., France

[21] Appl. No.: 635,325

[22] Filed: Jul. 27, 1984

Related U.S. Application Data

[63] Continuation of Ser. No. 337,544, Jan. 6, 1982, abandoned.

[51] Int. Cl.$^4$ ............................................. B65D 55/14
[52] U.S. Cl. ....................................... 70/169; 70/380; 220/210; 292/19; 292/303
[58] Field of Search .......... 70/167, 166, 380, 163–165, 70/168, 169; 292/19, 303; 220/210

[56] References Cited

U.S. PATENT DOCUMENTS

| | | | |
|---|---|---|---|
| 464,610 | 12/1891 | Finck | 70/166 |
| 1,019,052 | 3/1912 | Ketler | 70/166 |
| 1,267,284 | 5/1918 | Shanahan | 70/169 |
| 1,691,975 | 11/1928 | Irwin | 70/168 |
| 1,770,710 | 7/1930 | Prince | 70/168 |
| 1,929,701 | 10/1933 | McCalister | 70/168 |
| 1,968,506 | 7/1934 | Schneider | 70/167 |
| 2,073,851 | 3/1937 | Powell | 70/169 |
| 2,431,458 | 11/1947 | Budreck et al. | 70/172 |
| 4,013,191 | 3/1977 | Gerdes | 220/210 X |
| 4,362,036 | 12/1982 | Shanklin | 70/167 |

Primary Examiner—Kenneth J. Dorner
Assistant Examiner—Lloyd A. Gall

[57] ABSTRACT

The cap comprises attaching devices and key-actuated locking devices which are independent from the attaching devices. This enables the cap to be shifted by hand without use of the key if desired. The locking devices comprise a plurality of elastically yieldable strips which are part of a single member which is fixed to the body of the cap. The end portion of each strip is located in alignment with an aperture of the body and bears against the bottom of a cam groove of a member which is connected to rotate with a lock barrel receiving the key.

6 Claims, 10 Drawing Figures

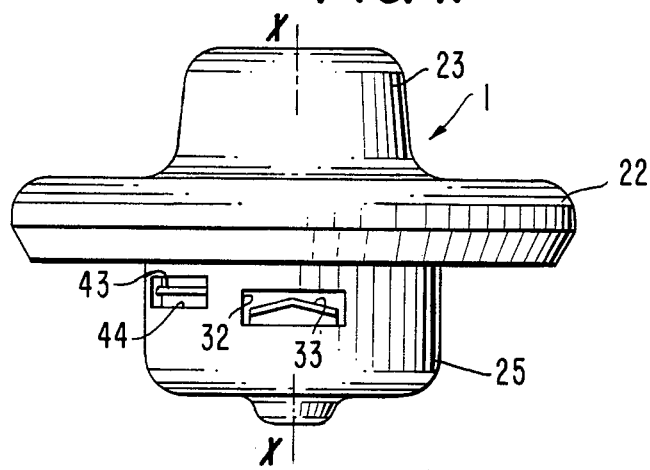
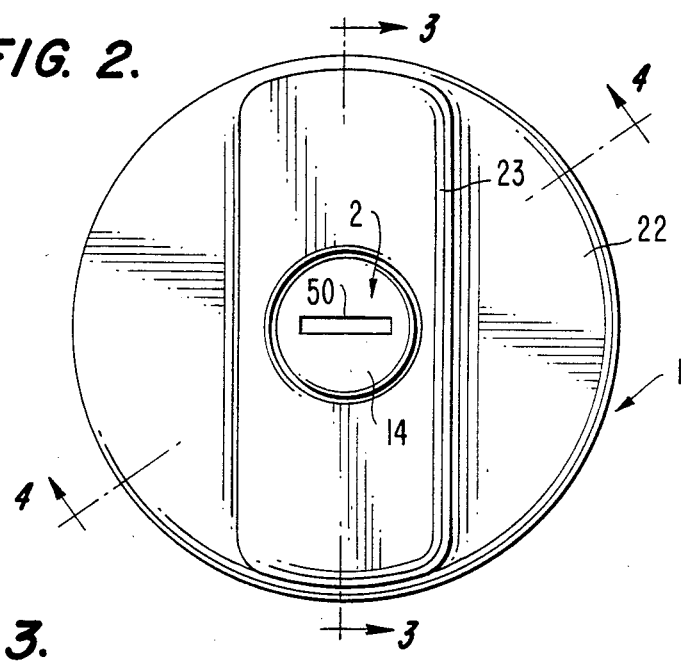
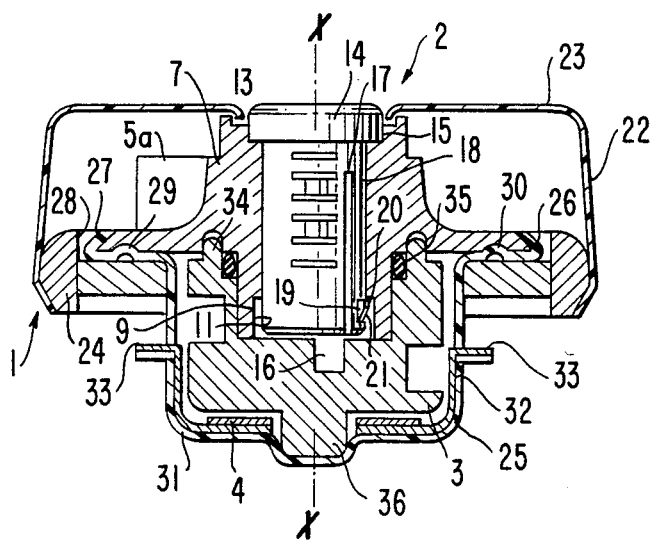
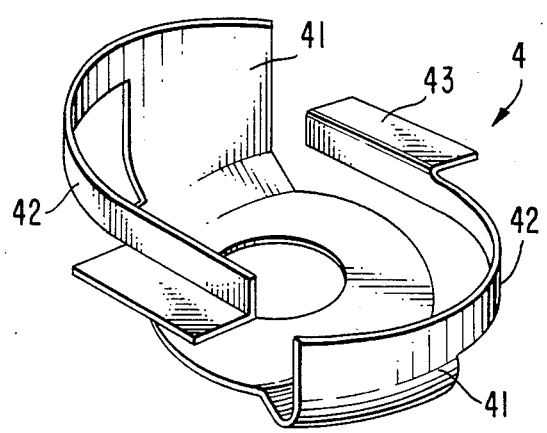

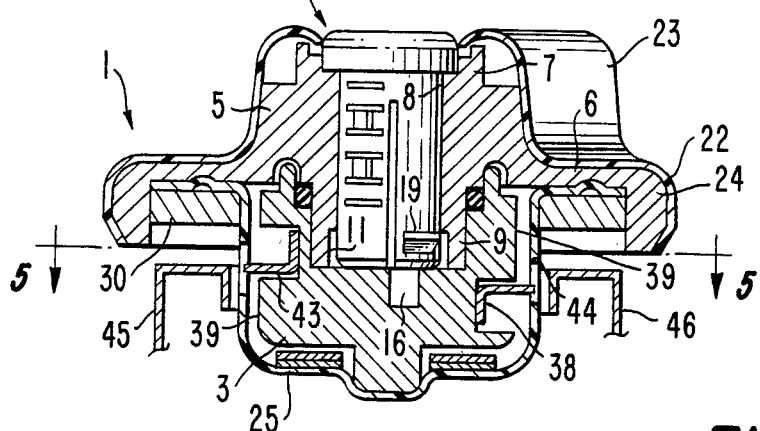
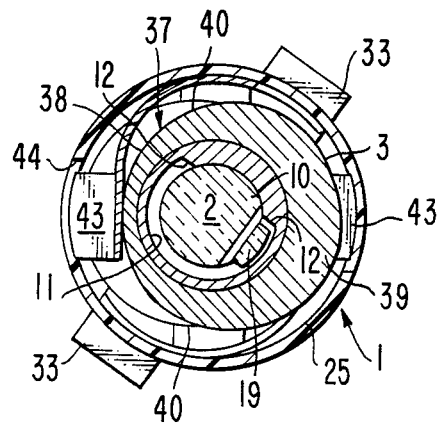
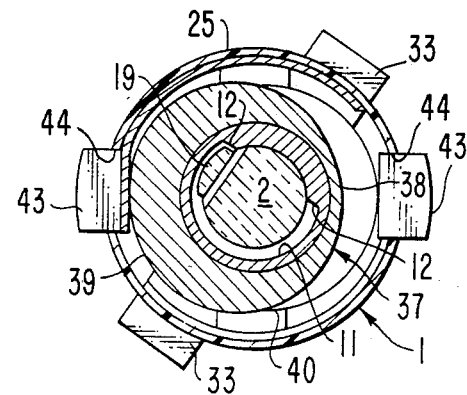
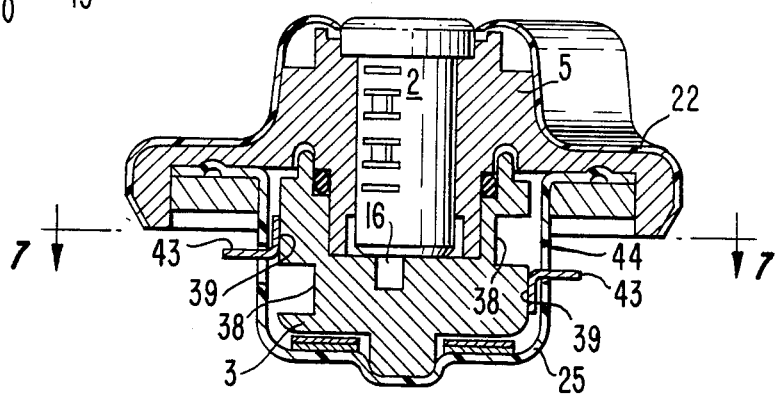
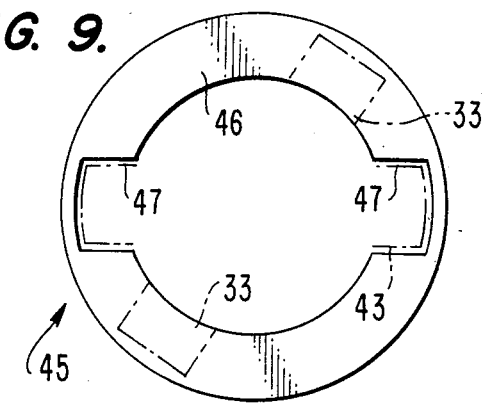
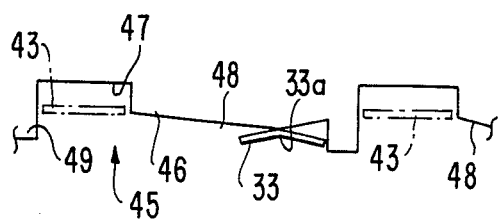

CAP FOR A CONTAINER AND IN PARTICULAR FOR A FUEL TANK FOR AN AUTOMOBILE VEHICLE

DESCRIPTION

This application is a continuation of application Ser. No. 337,544, filed 1/6/82 now abandoned.

The present invention relates to a cap or plug for a container and in particular for a fuel tank of an automobile vehicle, of the type comprising means for attaching the cap to an opening of the container and means for locking the cap in the attached position, and actuated by a key and independent of the attaching means, said locking means comprising a key-actuated barrel rotatively mounted in the body of the cap and at least one locking element which is radially movable in the body so as to project through an aperture of the body or to retract into the body under the effect of the rotation of the barrel.

In order to avoid theft, it is conventional to provide, in addition to the means for attaching caps to an opening of the container, independent locking means actuated by a key. These caps may, when desired, be attached and detached simply manually without requiring the use of the key for each attachment or removal of the cap. This is, for example, advantageous when an automobile vehicle driver travels over a long distance which requires several refuelings.

In the caps of the aforementioned type, the locking element is formed by a ring which is rotatively mounted on an eccentric element connected to the key-actuated barrel (French Pat. No. 2 285 503), or by a slide which has a slot in which engages a lug of the barrel (U.S. Pat. Nos. 1,924,308 and 2,431,458). These arrangements require much precision and render the assembly of the cap complicated, above all if it is desired to provide a plurality of locking elements arranged on the periphery of the cap.

An object of the invention is to provide a cap having the same properties but much cheaper to manufacture.

The invention provides a cap of the aforementioned type, wherein the locking element is formed by the free end of an elastically yieldable strip whose other end is fixed to the body.

In an embodiment which ensures a reliable balanced locking at a plurality of points on the periphery of the cap without complicating the assembly, the cap comprises a plurality of locking elements which are evenly spaced apart on the periphery of the cap, and all the strips are part of a single member fixed to the body.

The invention will be described hereinafter in more detail with reference to the accompanying drawings which illustrate only one embodiment of the invention. In these drawings:

FIG. 1 is a side elevational view of an automobile tank cap according to the invention, in which the locking means are in the inoperative position;

FIG. 2 is a plan view of this cap;

FIGS. 3 and 4 are sectional views taken on lines 3—3 and 4—4 respectively of FIG. 2;

FIG. 5 is a sectional view taken on line 5—5 of FIG. 4;

FIG. 6 is a view similar to FIG. 4 of the cap in which the locking means are in the operative position;

FIG. 7 is a sectional view taken on line 7—7 of FIG. 6;

FIG. 8 is a perspective view of a member for locking the cap;

FIG. 9 is a plan view of the opening of a filler pipe of a fuel tank which is to be closed by the cap shown in FIGS. 1 to 8, and FIG. 10 is a developed view of this opening of the filler pipe.

The tank cap or plug shown in FIGS. 1 to 8 comprises mainly a body 1, a barrel 2, a double cam 3 and a locking member 4 which is shown alone in perspective in FIG. 8.

The body 1 comprises an upper member 5, for example of plastics material, having the general shape of a horizontal disc 6 whose axis X—X is vertical and is provided with a tubular projection 7 on its upper side. The projection 7 is provided with a cylindrical bore 8 which has an axis X—X and extends downwardly in the form of an externally cylindrical spigot 9. The lower part of the latter has, on a small fraction of its circumference, a cylindrical inner wall 10 whose diameter is equal to that of the bore 8 and, on the rest of its circumference, a cylindrical inner wall 11 of larger diameter which is connected to the wall 10 by two coplanar planar surfaces 12 which are parallel to the axis X—X (FIGS. 5 and 7).

The barrel 2 comprises a cylindrical main portion 13 having the same diameter as the bore 8 and engaged in the latter and surmounted by a larger head 14. The latter is received in a counter-bore 15 provided at the upper end of the bore 8. The lower side of the barrel 2 is roughly located in the same horizontal plane as the the lower side of the spigot 9 of the body 1 and an eccentric lug 16 downwardly extends beyond this side.

The portion 13 of the barrel 2 has two neighbouring vertical slots 17 which extend from the base of the portion 13 and define therebetween an elastically yieldable tongue portion 18 whose lower end carries an outer projection 19. The latter has the shape of a block whose upper face 20 is horizontal and whose lower face 21 is downwardly and inwardly inclined, this projection being disposed in the large-diameter region 11 of the spigot 9.

The projection 19 has a double function, namely it acts as an axial retaining means and a lateral abutment. When the barrel 2 is inserted in the bore 8, the tongue portion 18 is urged radially inwardly and it returns elastically to its initial shape when the projection 19 is completely contained in the region 11 of the spigot 9. This occurs when the head 14 of the barrel reaches a position of axial abutment, so that the barrel is mounted by a simple clipping action. Further, the rotation of the barrel 2 in both directions is limited by the fact that the projection 19 abuts either of the planar surfaces 12 of the body 1. In the illustrated embodiment, these two positions of abutment correspond to two positions of the barrel 2 at 180° to each other. Further, the barrel 2 contains a key-actuated lock mechanism.

Fixed on the member 5 of the body 1 is a hollow downwardly open cover 22 of prelacquered press-formed sheet metal or of plastics material. The interior shape of this cover marries up with that of the member 5 except for the fact that it includes a diametral projection 23 whose width corresponds to the outside diameter of the tubular projection 7 of the member 5. The lower periphery of the cover 22 is fixed, for example by a forming-over operation or welded by ultra-sounds welding, to the periphery of a skirt portion 24 which depends from the periphery of the disc 6 of the member 5. Provided in the middle of the projection 23 is a circular aperture, the periphery of which is secured to the periphery of the counter-bore 15 of this member 5. The cover 22 is connected to rotate with the member 5 by means of radial projections 5a on the latter (FIG. 3) which cooperate with the diametral projection 23 of the cover 22.

The lower part of the body 1 is constituted by a cup 25 of press-formed sheet metal which has an axis X—X and an upper flange 26 which is upwardly formed over in the horizontal plane. The upper part of this cup 25 enters the skirt portion 24 and the periphery of the flange 26 is fixed to the disc 6 by a forming over of a series of circumferential tabs 27 in corresponding openings 28 which extend through this disc. The forming over of the tabs 27 render the parts 25 and 5 rigid with each other and provides a sealed contact between the disc 6 and a circular boss 29 which is press-formed in the flange 26 and projects upwardly.

The body 1 is completed by an annular elastically yieldable sealing element 30 which is applied under the flange 26 between the cylindrical outer wall of the cup 25 and the inner wall of the skirt portion 24 and by a stainless steel strip 31. The latter comprises an annular web from which extend two diametrically opposed arms which marry up with the inner shape of the cup 25 and are formed over outwardly at a right angle in the region of two openings 32 in the cup so as to form two attaching tabs 33. As can be seen in FIG. 1, the tabs 33 have a large-angled roof shape. The strip 31 is spot-welded to the bottom of the cup 25.

The double cam 3 is in the form of a member which has a generally cylindrical shape of axis X—X and has, at its upper end, a cylindrical coaxial cavity which is an interference fit on the spigot 9. The opening of this member is surrounded by a circular projection 34. The bottom of this cavity has an eccentric aperture which receives the lug 16 of the barrel 2 so that the latter is connected to rotate with the member 3. The projection 34 is received in a circular groove in the lower face of the disc 6 and an annular sealing element 35 is interposed between this projection and the outer wall of the spigot 9. Projecting from the lower face of the member 3 is a centre cylindrical boss 36 which is received in a complementary cavity in the bottom of the cup 25 which completes the rotational guiding of the double cam.

The member 3 comprises two superimposed cam grooves 37 of variable radius on the periphery (FIGS. 5 and 7). More precisely, each groove 37 has a region 38, of small radius, a region 39 of large radius, and two connecting regions 40 of variable radius. The region 38 of the two grooves are diametrically opposed, and the same is true of the regions 39, on one hand, and the pairs of regions 40, on the other hand.

The locking member 4 is made from folded stainless steel and comprises an annular web welded to that of the strip 31 and coaxially positioned in the body. Two diametrically opposed arms 41 extend from this web and marry up with the inner profile of the cup 25. Extending from the free end of each arm 41 is a horizontal elastically yieldable strip 42 whose extent is roughly a quarter of a circle and whose free end portion is bent outwardly at a right angle and forms a horizontal locking tab 43. The two tabs 43 are located at slightly different levels in confronting relation to two diametrically opposed apertures 44 in the cup 25 and are elastically yieldably applied against the respective cam grooves 37 of the member 3.

In the extreme position of the barrel 2 illustrated in FIGS. 4 and 5, the two regions 38 of small radius are in alignment with the apertures 44. The free ends of the strips 42 of the member 4 are applied elastically against these regions 38 so that the tabs 43 are fully retracted into the cup 25.

When the barrel 2 is brought to its other extreme position, the regions 40, and then the regions 39 of large radius, come into alignment with the apertures 44 and cause the tabs 43 to progressively extend out of these apertures until the locking position of FIGS. 6 and 7 is reached. The structure of the barrel allows the extraction of the key in these two extreme positions of the barrel.

The cap just described is adapted to close the filling opening 45 of a filler pipe of a fuel tank of an automobile vehicle. The opening 45 is illustrated in FIGS. 9 and 10 and diagrammatically represented in FIG. 4.

In order to place the cap in position with the tabs 43 withdrawn, the attaching tabs 33 are hooked under the end flange 46 (which is doubly inwardly formed over) of the filler pipe (FIG. 4).

This hooking is effected without the key. With reference to FIGS. 9 and 10, by a downward axial displacement, the tabs 33 pass without clearance through the notches 47 of the flange 46 and then, by a rotation of the cap by acting on the diametrical projection 23 of the cover 22 in the manner of a wing nut, the tabs 33 are placed under this flange and travel along a descending ramp 48 and finally abut a lug 49 which is adjacent to the opposite notch 47 after the apex 33a of each tab 33 has passed through a low point. A seal is achieved by the compression of the entire periphery of the sealing element 30 against the flange 46. The rotation of the cap is limited to about 120° by the abutments 49 provided on the filler pipe, and, when the cap is in position, the apertures 44 are located in alignment with the notches 47 through which the tabs 33 pass.

The cap can then be withdrawn by hand by a reverse rotation and then an upward axial translation, these operations being repeated as many times as required without intervention of the key.

On the other hand, if it is desired to lock the cap in position, the barrel 2 is rotated by means of a key inserted in an upper slot 50 of the barrel (FIG. 1), until its other extreme position is reached (FIGS. 6 and 7). This brings the connecting regions 40, and then the region 39 of large radius, of the cam grooves 37 into alignment with the apertures 44 and causes the tabs 43 to project out of the latter. The tabs 43 then enter the notches 47 of the pipe 45 and thus prevent any subsequent rotation of the cap in either direction, as shown in dot-dash lines in FIGS. 9 and 10. The cap is then locked and can only be withdrawn by withdrawing, by means of the key, the tab 43 by a return rotaton of the barrel 2 to its initial position and then by releasing the bayonet hooking in the manner described hereinbefore.

Note that the cap according to the invention may be employed with a filler pipe having a conventional opening which may, if desired, be attached to the pipe, such as that shown in FIGS. 9 and 10.

In the embodiment shown in the drawings, the cap is of the sealed type. By way of a modification, the cap may comprise any venting device, eg. of the type employing a ball check-valve or a diaphragm incorporated in the member 5 of the body 1.

Note that a minor modification of the cap enables it to be converted into a key-less cap. Indeed, for this purpose, it is sufficient to employ a cover 22 without the centre opening and/or to construct the assembly 3-5 in a single moulded part.

In another modification, it will be understood that it is possible to provide more than two tabs 33 and/or more than two tabs 43 evenly spaced apart on the periphery of the cap, the shape of the cam grooves 37 being, if required, modified correspondingly.

Having now described our invention what we claim as new and desire to secure by Letters Patent is:

1. A filler cap for a container comprising means defining an opening, said container being in particular, a fuel tank of an automobile vehicle, the cap comprising a body, means for attaching the cap to said opening of the container, key-actuated means for locking the cap in the attached position independent from the attaching means, said locking means comprising a barrel which receives a key and is rotatively mounted in said body, at least one locking element which is radially movable in said body, an aperture in said body through which aperture said locking element is movable so as to be capable of assuming selectively a projecting position relative to said aperture and a retracted position within said body, the barrel being associated with the locking element so as to cause the radial movement of the locking element selectively to said projecting position and said retracted position upon rotation of the barrel relative to the body, and an elastically yieldable strip having a free end portion which constitutes the locking element and an opposite end portion which is fixed to and coaxially positioned in said body.

2. A cap according to claim 1, wherein the container has a flange defining a recess and the attaching element comprises a fixed projection of the body which is circumferentially offset relative to said aperture and is adapted to pass through said recess in said flange to engage itself under said flange by rotation through a predetermined angle, so as to create an attachment by a hooking action of the bayonet type, said angle being equal to the subtended angle of said circumferential offset.

3. A cap according to claim 1 or 2, comprising a cam which has a variable radius and is rotatively mounted on said body and is rigid with the barrel and associated with the locking element for shifting the locking element between said projecting position and said retracted position.

4. A cap according to claim 1, comprising a plurality of said locking elements evenly spaced apart on the periphery of the cap, all corresponding strips of the locking elements being part of a single member fixed to said body.

5. A cap according to claim 4, wherein said single member comprises a center web portion fixed to a bottom of said body, from which web portion generally axially extend arms which carry the strips, each strip extending circumferentially from a free end of the corresponding arm.

6. A cap according to claim 4 or 5, wherein each locking element is located at a given level, and a member which is rotatively mounted in said body and rigid with the barrel carries a plurality of means defining cam grooves, which cam grooves have a variable radius and are superimposed and circumferentially offset relative to each other, a corresponding one of said locking elements being elastically yieldably applied against a bottom of each cam groove.

* * * * *